US010899600B2

(12) United States Patent
Frieburger et al.

(10) Patent No.: US 10,899,600 B2
(45) Date of Patent: Jan. 26, 2021

(54) CLOSED SYSTEM VALVE ASSEMBLY WITH EXPANDED FLOW PATH

(71) Applicant: Tuthill Corporation, Fort Wayne, IN (US)

(72) Inventors: Benjamin Frieburger, Yoder, IN (US); Brock Holley, Fort Wayne, IN (US); Thomas Headley, Roanoke, IN (US); Matthew Gevers, Fort Wayne, IN (US)

(73) Assignee: BERICAP HOLDING GMBH, Budenheim (DE)

( * ) Notice: Subject to any disclaimer, the term of this patent is extended or adjusted under 35 U.S.C. 154(b) by 357 days.

(21) Appl. No.: 15/882,106

(22) Filed: Jan. 29, 2018

(65) Prior Publication Data

US 2018/0215605 A1 Aug. 2, 2018

Related U.S. Application Data

(60) Provisional application No. 62/622,348, filed on Jan. 26, 2018, provisional application No. 62/452,496, filed on Jan. 31, 2017.

(51) Int. Cl.
*B67D 7/02* (2010.01)
*B67D 7/32* (2010.01)
(Continued)

(52) U.S. Cl.
CPC ......... *B67D 7/0294* (2013.01); *B67D 7/3209* (2013.01); *F16L 29/04* (2013.01); *F16L 37/32* (2013.01); *Y10T 137/87957* (2015.04)

(58) Field of Classification Search
CPC ..... Y10T 137/87925; Y10T 137/87941; Y10T 137/87957; Y10T 137/87965; F16L 37/32; F16L 37/36; F16L 29/04
See application file for complete search history.

(56) References Cited

U.S. PATENT DOCUMENTS

| 2,665,928 A * | 1/1954 | Omon ................. F16L 37/23 285/313 |
| 3,513,887 A * | 5/1970 | Limandri ............. B67D 7/362 141/207 |

(Continued)

FOREIGN PATENT DOCUMENTS

| DE | 20 2006 014 061 U1 | 12/2006 |
| DE | 10 2009 019 933 | 11/2010 |

(Continued)

OTHER PUBLICATIONS

International Search Report and Written Opinion, dated May 9, 2018, PCT/US2018/015847.

(Continued)

*Primary Examiner* — Timothy P. Kelly
(74) *Attorney, Agent, or Firm* — Barnes & Thornburg LLP (57) ABSTRACT

An expanded flow rate receiver valve assembly attaches to a first fluid container and is in fluid communication with the first fluid container. The expanded flow rate receiver valve assembly includes a coupling section that selectively receives a closure valve attached to a second fluid container that selectively releases and restricts fluid contained in the second fluid container. The expanded flow rate receiver valve assembly also includes a valve chamber in fluid communication with the coupling section and located adjacent a coupling section opening. The valve chamber is in fluid communication with the first fluid container.

18 Claims, 7 Drawing Sheets

(51) Int. Cl.
*F16L 37/32* (2006.01)
*F16L 29/04* (2006.01)

(56) References Cited

U.S. PATENT DOCUMENTS

| | | | |
|---|---|---|---|
| 4,081,006 | A | 3/1978 | Crowell et al. |
| 4,313,477 | A | 2/1982 | Sebalos |
| 4,508,173 | A | 4/1985 | Read |
| 5,029,624 | A | 7/1991 | McCunn et al. |
| 5,641,012 | A | 6/1997 | Silversides |
| 5,947,171 | A | 9/1999 | Woodruff |
| 5,960,840 | A | 10/1999 | Simmel et al. |
| 5,996,653 | A | 12/1999 | Piccinino, Jr. |
| 6,170,543 | B1 | 1/2001 | Simmel et al. |
| 6,220,482 | B1 | 4/2001 | Simmel et al. |
| 6,418,987 | B1 | 7/2002 | Colasacco |
| 7,121,437 | B2 | 10/2006 | Kasting |
| 7,392,922 | B2 | 7/2008 | Vanstaan et al. |
| 7,546,857 | B2 | 6/2009 | Chadbourne et al. |
| 7,686,194 | B2 | 3/2010 | Kasting |
| 8,925,593 | B2 | 1/2015 | Lamboux |
| 10,189,614 | B2 | 1/2019 | Pruiett |
| 2002/0139867 | A1 | 10/2002 | Bulloch et al. |
| 2015/0276069 | A1 | 10/2015 | Saragosa et al. |
| 2015/0321836 | A1 | 11/2015 | Speas |

FOREIGN PATENT DOCUMENTS

| | | |
|---|---|---|
| DE | 10 2015 103 754 B3 | 2/2016 |
| DE | 20 2013 103 516 U1 | 12/2018 |
| WO | WO 2011/058541 A1 | 5/2011 |

OTHER PUBLICATIONS

International Preliminary Report on Patentability—PCT/US2018/015847—dated Aug. 6, 2019.
International Search Report and Written Opinion, dated Jun. 19, 2018, PCT/US2018/025016.
International Search Report and Written Opinion of the International Searching Authority, dated Aug. 14, 2017.

\* cited by examiner

CLOSED SYSTEM VALVE ASSEMBLY WITH EXPANDED FLOW PATH

RELATED APPLICATIONS

The present application is related to and claims priority to U.S. Provisional Patent Application, Ser. No. 62/452,496 filed on Jan. 31, 2017, entitled CLOSED SYSTEM VALVE ASSEMBLY WITH EXPANDED FLOW PATH, and to U.S. Provisional Patent Application, Ser. No. 62/622,348 filed on Jan. 26, 2018, entitled SEALED DISPENSING MECHANISMS FOR CLOSED LOOP FLUID SYSTEMS. The subject matter disclosed in these provisional applications are hereby expressly incorporated into the present application.

TECHNICAL FIELD AND SUMMARY

The present disclosure relates to closed loop fluid transfer mechanisms, and particularly to accessories that can dispense fluid from one closed-loop supply container to another.

Due to the dangers of certain chemical fluids, it is sometimes necessary to limit the fluids' ability to come into contact with any person or thing prior to its intended use. In some instances, however, such fluids need to be transferred from one container to another. For example, instances may arise where a hazardous fluid may need to be transferred from a bottle into a tank. This is why closed loop fluid transfer systems have been developed over the years. These systems include dispensing caps with valves that attach to the dispensing and receiving containers to effectuate transfer between same without any fluid exiting the connection between the containers. Such systems prevent opening the dispensing container until it connects with the receiving container.

Connectors have been developed to control dispensing such chemical and/or hazardous fluid. Examples include U.S. Pat. No. 5,960,840 ('840 patent), titled "Controlled Product Dispensing System," issued Oct. 5, 1999, and U.S. Pat. No. 6,170,543 ('543 patent), titled "Controlled Product Dispensing System," issued Jan. 9, 2001, the disclosures of which are all herein incorporated by reference in their entirety. They disclose closure and valve adaptors that facilitate direct fluid transfer from one container to another.

An illustrative embodiment of the present disclosure provides an expanded receiver such as a tank rinse valve that has expanded flow rate capabilities. In an illustrative embodiment, the opening in the rinse valve has fewer obstructions which allows liquid flowing from a closure valve, for example, to a tank to dispense much faster.

Accordingly, an illustrative embodiment of the present disclosure provides an expanded flow rate receiver valve assembly that attaches to a first fluid container and is in fluid communication with the first fluid container. The expanded flow rate receiver valve assembly comprises: a coupling section that selectively receives a closure valve attached to a second fluid container that selectively releases and restricts fluid contained in the second fluid container; a valve chamber in fluid communication with the coupling section and located adjacent a coupling section opening; wherein the valve chamber has a diameter; wherein the valve chamber is in fluid communication with the first fluid container; wherein the coupling section opening is formed by an edge of the coupling section and is sized to be located adjacent an end of the closure valve when received in the coupling section; wherein the edge of the coupling section includes a ledge that extends from the edge, away from the coupling section opening, and between the coupling section and the valve chamber; wherein the coupling section opening has a diameter that is less than the diameter of the valve chamber; wherein the coupling section includes a recess spaced apart from the coupling section opening and the valve chamber, and is configured to be located adjacent the closure valve; and an O-ring or other like seal that is fitted into the recess to abut the closure valve received in the coupling section to create a seal between the coupling section and the closure valve so no fluid can escape from the expanded flow rate receiver valve assembly between the O-ring and the closure valve. In addition, the valve chamber further includes: a valve member that engages the closure valve to open the closure valve to selectively release fluid from the second fluid container and into the valve chamber; an opening located opposite the coupling section opening and defined by a chamfered surface that forms the periphery of the opening; wherein the opening of the valve chamber is in fluid communication with the first fluid container; a sidewall that forms a periphery of the valve chamber and connects to the coupling section adjacent the ledge of the coupling section; a plateau surface that connects to the chamfered surface opposite the opening and connects adjacent a lower edge of the sidewall opposite the coupling section; wherein the plateau extends transverse from the sidewall; at least one crossbar that extends transverse from the sidewall of the valve chamber and extends from the plateau and the chamfered surface; wherein fluid that is selectively released from the closure valve travels through the valve chamber, past the crossbar, through the opening of the valve chamber, and into the first fluid container.

In the above and other embodiments, the expanded flow rate receiver valve assembly may further comprise: the plateau that extends transverse to the sidewall is positioned about perpendicular to the sidewall; the at least one cross bar is a plurality of cross bars; a dispense conduit in fluid communication with the opening of the valve chamber and located opposite the coupling section opening, wherein the dispense conduit is also in fluid in communication with the first fluid container; the crossbar is located in the valve chamber and not located in the dispense conduit; and the crossbar includes a base that supports a spring to move the valve member that selectively closes the closure valve.

Another illustrative embodiment of the present disclosure provides an expanded flow rate receiver valve assembly that attaches to a first fluid container and is in fluid communication with the first fluid container. The expanded flow rate receiver valve assembly comprises: a coupling section that selectively receives a closure valve attached to a second fluid container that selectively releases and restricts fluid contained in the second fluid container; and a valve chamber in fluid communication with the coupling section and located adjacent a coupling section opening; wherein the valve chamber is in fluid communication with the first fluid container. The valve chamber further includes: an opening located opposite the coupling section opening and defined by a chamfered surface that forms a periphery of the opening; wherein the opening of the valve chamber is in fluid communication with the first fluid container; a sidewall that forms a periphery of the valve chamber and connects to the coupling section; a plateau surface that connect to the chamfered surface opposite the opening and connects adjacent a lower edge of the sidewall opposite the coupling section; wherein the plateau extends transverse from the sidewall; at least one crossbar that extends transverse from the sidewall of the valve chamber and extends from the plateau and the chamfered surface; wherein fluid that is selectively released from the closure valve travels through the valve chamber, past the crossbar, through the opening of the valve chamber, and into the first fluid container.

In the above and other embodiments, the expanded flow rate receiver valve assembly may further comprise: the valve chamber having a diameter, and the coupling section opening having a diameter that is less than the diameter of the valve chamber; the coupling section opening being formed by an edge of the coupling section and is sized to be located adjacent an end of the closure valve when received in the coupling section; the edge of the coupling section including a ledge that extends from the edge, away from the coupling section opening, and between the coupling section and the valve chamber; the coupling section including a recess spaced apart from the coupling section opening and the valve chamber, and is configured to be located adjacent the closure valve; an O-ring that is fitted into the recess to abut the closure valve received in the coupling section to create a seal between the coupling section and the closure valve so no fluid can escape from the expanded flow rate receiver valve assembly between the O-ring and the closure valve; a valve member that engages the closure valve to open the closure valve to selectively release fluid from the second fluid container and into the valve chamber; and the sidewall that forms the periphery of the valve chamber and connects to the coupling section adjacent the ledge of the coupling section.

Another illustrative embodiment of the present disclosure provides an expanded flow rate receiver valve assembly that attaches to a first fluid container and is in fluid communication with the first fluid container. The expanded flow rate receiver valve assembly comprises: a coupling section that selectively receives a closure valve attached to a second fluid container that selectively releases and restricts fluid contained in the second fluid container; a valve chamber in fluid communication with the coupling section and located adjacent a coupling section opening; wherein the valve chamber is in fluid communication with the first fluid container; wherein the coupling section opening is formed by an edge of the coupling section and is sized to be located adjacent an end of the closure valve when received in the coupling section; wherein the edge of the coupling section includes a ledge that extends from the edge, away from the coupling section opening, and between the coupling section and the valve chamber; wherein the coupling section includes a recess spaced apart from the coupling section opening and the valve chamber, and is configured to be located adjacent the closure valve; and an O-ring that is fitted into the recess to abut the closure valve received in the coupling section to create a seal between the O-ring and the closure valve so no fluid can escape from the expanded flow rate receiver valve assembly between the O-ring and the closure valve; and wherein fluid that is selectively released from the closure valve travels through the valve chamber, past the crossbar, through the opening of the valve chamber, and into the first fluid container.

In the above and other embodiments, the expanded flow rate receiver valve assembly may further comprise: the valve chamber having a diameter, the coupling section opening having a diameter that is less than the diameter of the valve chamber; the valve chamber further including a valve member that engages the closure valve to open the closure valve to selectively release fluid from the second fluid container and into the valve chamber; the valve chamber further including an opening located opposite the coupling section opening and defined by a chamfered surface that forms the periphery of the opening; the opening of the valve chamber being in fluid communication with the first fluid container; the valve chamber further including a sidewall that forms a periphery of the valve chamber and connects to the coupling section adjacent the ledge of the coupling section; the valve chamber further includes a plateau surface that connects to the chamfered surface opposite the opening and connects adjacent a lower edge of the sidewall opposite the coupling section; and the plateau extending transverse from the sidewall, and at least one crossbar extending transverse from the sidewall of the valve chamber and extending from the plateau and the chamfered surface.

Additional features and advantages of the expanded flow rate receiver valve assembly will become apparent to those skilled in the art upon consideration of the following detailed descriptions exemplifying the best mode of carrying out the expanded flow rate receiver valve assembly as presently perceived.

BRIEF DESCRIPTION OF DRAWINGS

The concepts described in the present disclosure are illustrated by way of example and not by way of limitation in the accompanying figures. For simplicity and clarity of illustration, elements illustrated in the figures are not necessarily drawn to scale. For example, the dimensions of some elements may be exaggerated relative to other elements for clarity. Further, where considered appropriate, reference labels may be repeated among the figures to indicate corresponding or analogous elements.

Corresponding reference characters indicate corresponding parts throughout the several views. The exemplification set out herein illustrates embodiments of the expanded flow rate receiver valve assembly, and such exemplification is not to be construed as limiting the scope of the expanded flow rate receiver valve assembly in any manner.

DETAILED DESCRIPTION OF THE DRAWINGS

The figures and descriptions provided herein may have been simplified to illustrate aspects that are relevant for a clear understanding of the herein described devices, systems, and methods, while eliminating, for the purpose of clarity, other aspects that may be found in typical devices, systems, and methods. Those of ordinary skill may recognize that other elements and/or operations may be desirable and/or necessary to implement the devices, systems, and methods described herein. Because such elements and operations are well known in the art, and because they do not facilitate a better understanding of the present disclosure, a discussion of such elements and operations may not be provided herein. However, the present disclosure is deemed to inherently include all such elements, variations, and modifications to the described aspects that would be known to those of ordinary skill in the art.

Figure 1:
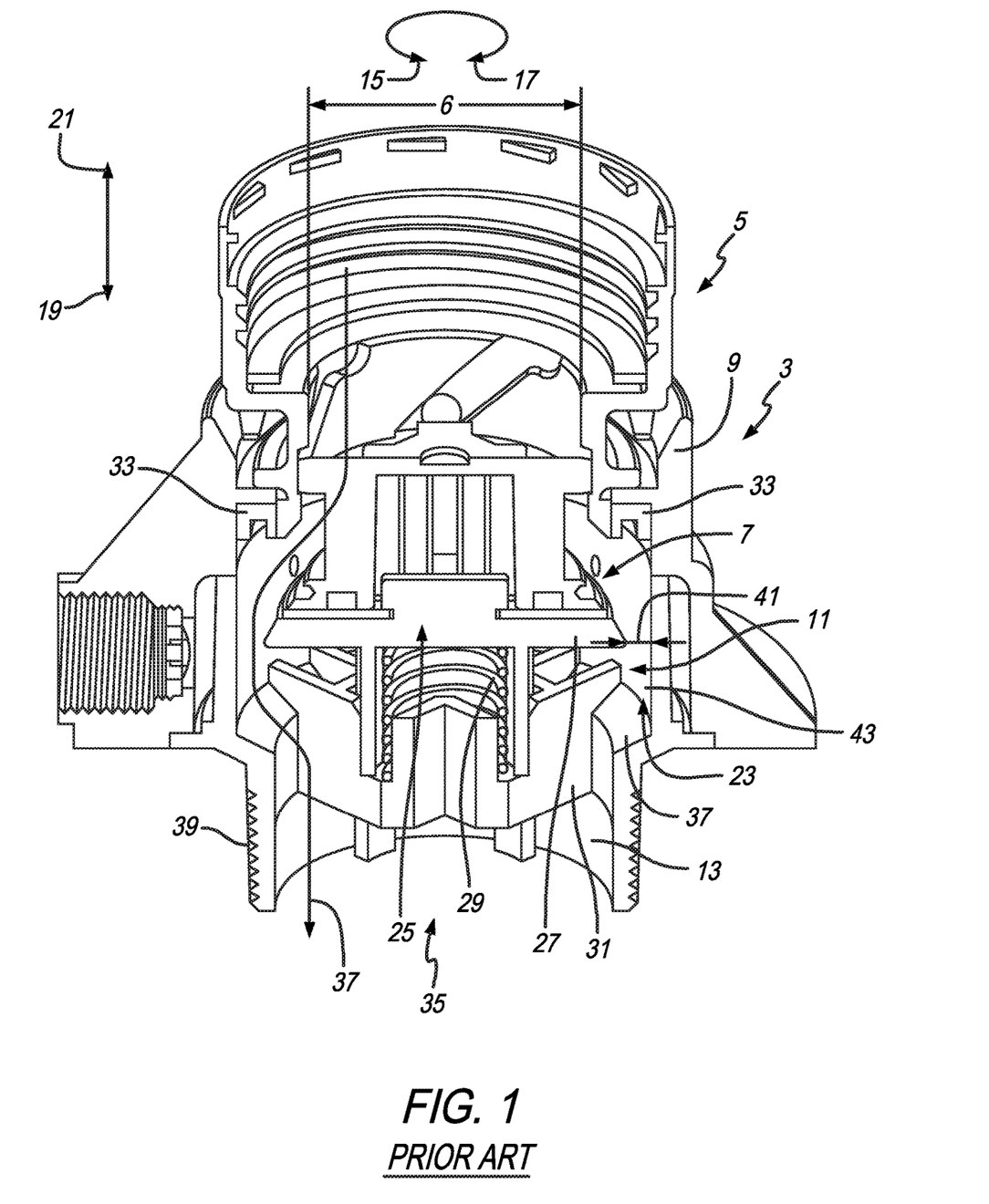
FIG. 1 is a perspective cross-sectional view of a PRIOR ART 63 millimeter tank rinse valve assembly.

A perspective cross-sectional view of an illustrative PRIOR ART 63 millimeter tank rinse valve assembly 3 is shown in FIG. 1. PRIOR ART tank rinse valve assembly 3 is shown coupled to a closure valve 5 with its valve member 7 located in an open position. This means any bottle, container, etc. capped by closure valve 5 may dispense its fluid through PRIOR ART tank rinse valve assembly 3 and into a receiving container. Such closure valve assemblies have been described in the foregoing patents as well as in U.S. Patent Application Nos. 62/429,341, titled "Sealed Dispensing Mechanism From A Closed Loop Fluid System—Auto Close", 62/432,812, titled, "Dispensing Mechanism From A Closed Loop Fluid System; Free Flowing", and 62/435,335, titled "Dispensing Mechanism From A Closed Loop Fluid System—Auto Close", collectively now all disclosed in U.S. Provisional Patent Application, Ser. No. 62/622,348 filed on Jan. 26, 2018, entitled "Sealed Dispensing Mechanisms For Closed Loop Fluid Systems." The disclosures of which are herein incorporated by reference in their entireties.

It is appreciated that closure valve 5, as shown in FIG. 1, attaches to PRIOR ART tank rinse valve assembly 3 as well as other valve assemblies in a similar manner to that disclosed in these recited applications. Closure valve 5 includes an inner passage diameter 6 through which fluid may pass and drain into PRIOR ART tank rinse valve assembly 3. PRIOR ART tank rinse valve assembly 3 includes a coupling section 9, valve chamber 11, and dispense conduit 13. Coupling section 9 is configured to selectively attach closure valve 5 to prior art tank rinse valve assembly 3. Here, as discussed in the aforementioned applications, coupling the two structures together and rotating closure valve 5 illustratively in direction 17 causes valve member 7 to move in direction 19 which opens up valve member 7. This allows fluid from any attached tank or container to flow out into PRIOR ART tank rinse valve assembly 3. Conversely, when rotating in direction 15, and lifted in direction 21, closure valve 5 lifts valve number 7 in direction 21 as well to seal off closure valve 5, thereby preventing any fluid from further flowing out of closure valve 5. Thus, closure valve 5 may be removed from PRIOR ART tank rinse valve assembly 3. Adjacent coupling section 9 is valve chamber 11. This, among other functions of this section, provides space 23 through which fluid dispensed from closure valve 5 may pass, to fill the attached tank or container. Another part of valve chamber 11 is chamber valve assembly 25 which includes valve member 27 configured to move in directions 21 and 19 when engaged or disengaged with valve number 7 of closure valve 5. A spring 29 illustratively sets on cross-beam 31 to provide an upward bias force in direction 21 against downward force in direction 19 caused by valve number 7 opening to dispense fluid. When closure valve 5 is removed, bias from spring 29 towards direction 21 causes valve number 27 to likewise move in direction 21 until it engages seal 33 thereby sealing off valve chamber 11 and PRIOR ART tank rinse valve assembly 3 from the outside atmosphere.

Dispense conduit 13 provides the final fluid passageway from closure valve 5 into the tank or container attached to PRIOR ART tank rinse valve assembly 3. As shown, cross-bar 31 is fitted in conduit portion 35 of dispense conduit 13 as well as a portion attached to chamfer surface 37 in valve chamber 11. Cross-bar 31 provides both a base structure for chamber valve assembly 25 to move same between open and closed positions. Cross-bar 31 also provides structural support for PRIOR ART tank rinse valve assembly 3. This view depicts a flow path 37 extending from closure valve 5 through valve chamber 11, and through dispense conduit 13. At which point the fluid will dispense into the attached tank or container. In this illustrative embodiment, the exterior surface of dispense conduit 13 includes a threaded surface 39 to assist attaching to its tank or container. It is appreciated that the valve members 7 and 27 as well as the valves 3 and 5 are cylindrical. Accordingly, flow path 37 is illustrative and represents all such flow path about the valve members and the valves.

An issue with this PRIOR ART tank rinse valve assembly 3 is that obstructions exist inside the assembly that limit the transfer flow rate of flow path 37 between closure valve 5 and the receiving tank or container. For example, with valve members 7 and 27 in the open position, a choke point 41 exists between interior wall 43 in space 23. Also, cross-beam 31 takes up a significant amount of space in dispense conduit 13, limiting the amount of fluid that may pass through conduit 35 at any given time. For example, dispensing a 2½ gallon jug of liquid out of closure valve 5 through into a standard PRIOR ART 63 mm tank rinse valve assembly 3 and into a tank is estimated to take about 30 seconds.

Figure 2:
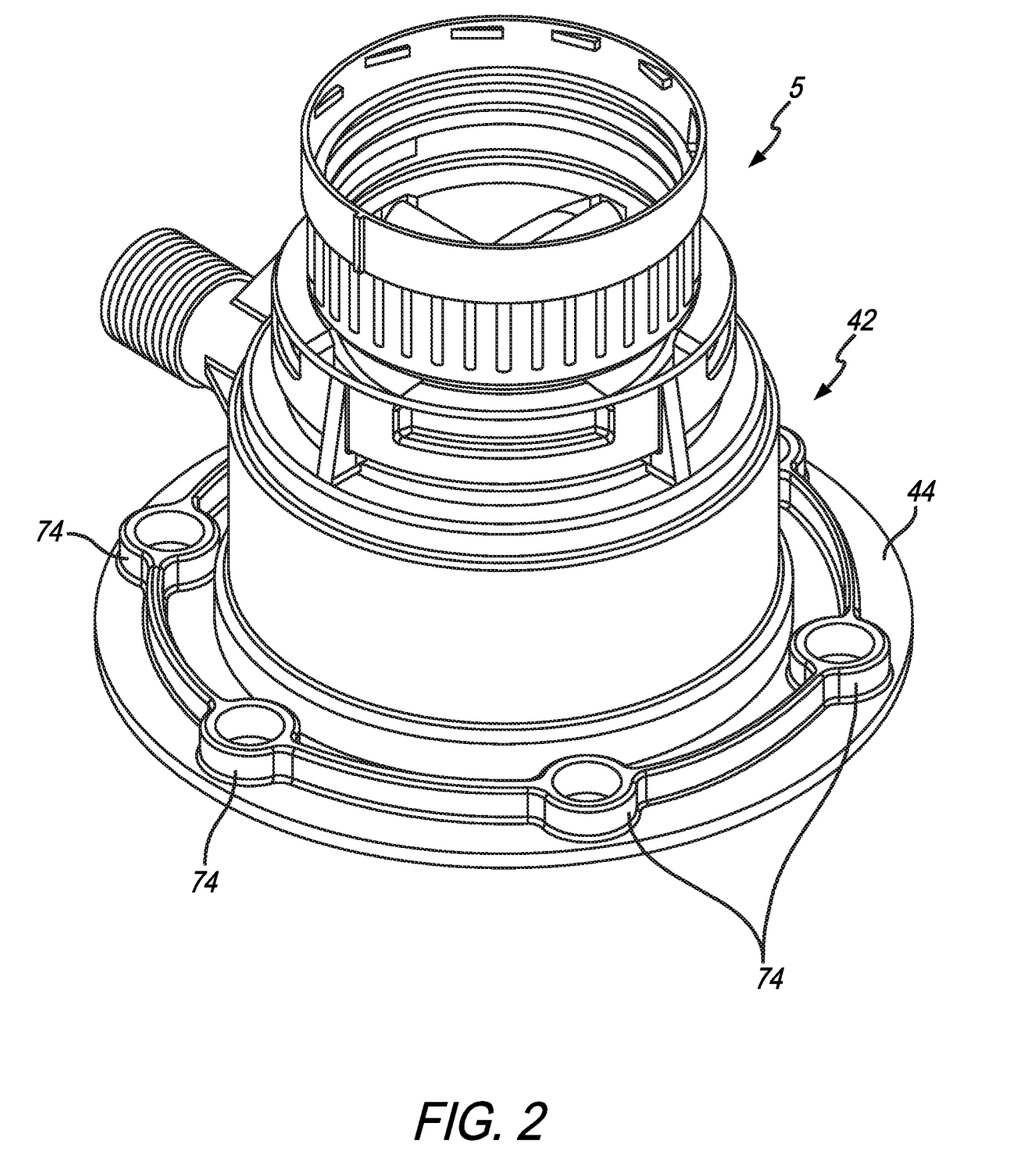
FIG. 2 is a perspective view of an expanded tank rinse valve assembly according to the present disclosure.

A perspective view of an expanded tank rinse valve assembly 42 according to the present disclosure is shown in FIG. 2. In this view, tank valve assembly 42 is coupled to closure valve 5. It is appreciated that closure valve 5 is of a type previously discussed herein and in the prior applications incorporated herein by reference. In addition, tank rinse valve assembly 42 is configured to be a replacement for PRIOR ART tank rinse valve assembly 3 shown in FIG. 1. It will be appreciated by the skilled artisan upon reading this disclosure that expanded tank rinse valve assembly 42 is configured to permit faster flow of liquid there through which translates into faster dispense time. This illustrative embodiment also includes a flange 44 extending about the cylindrical periphery of expanded tank rinse valve assembly 42. A plurality of illustrative fastener holes 74 are disposed through flange 44 and spaced thereabout to secure expanded tank rinse valve assembly 42 onto a tank or container. It is within the scope of this disclosure that other fastener means may be employed to secure expanded tank rinse valve assembly 42 onto a tank or retainer.

Figure 3:
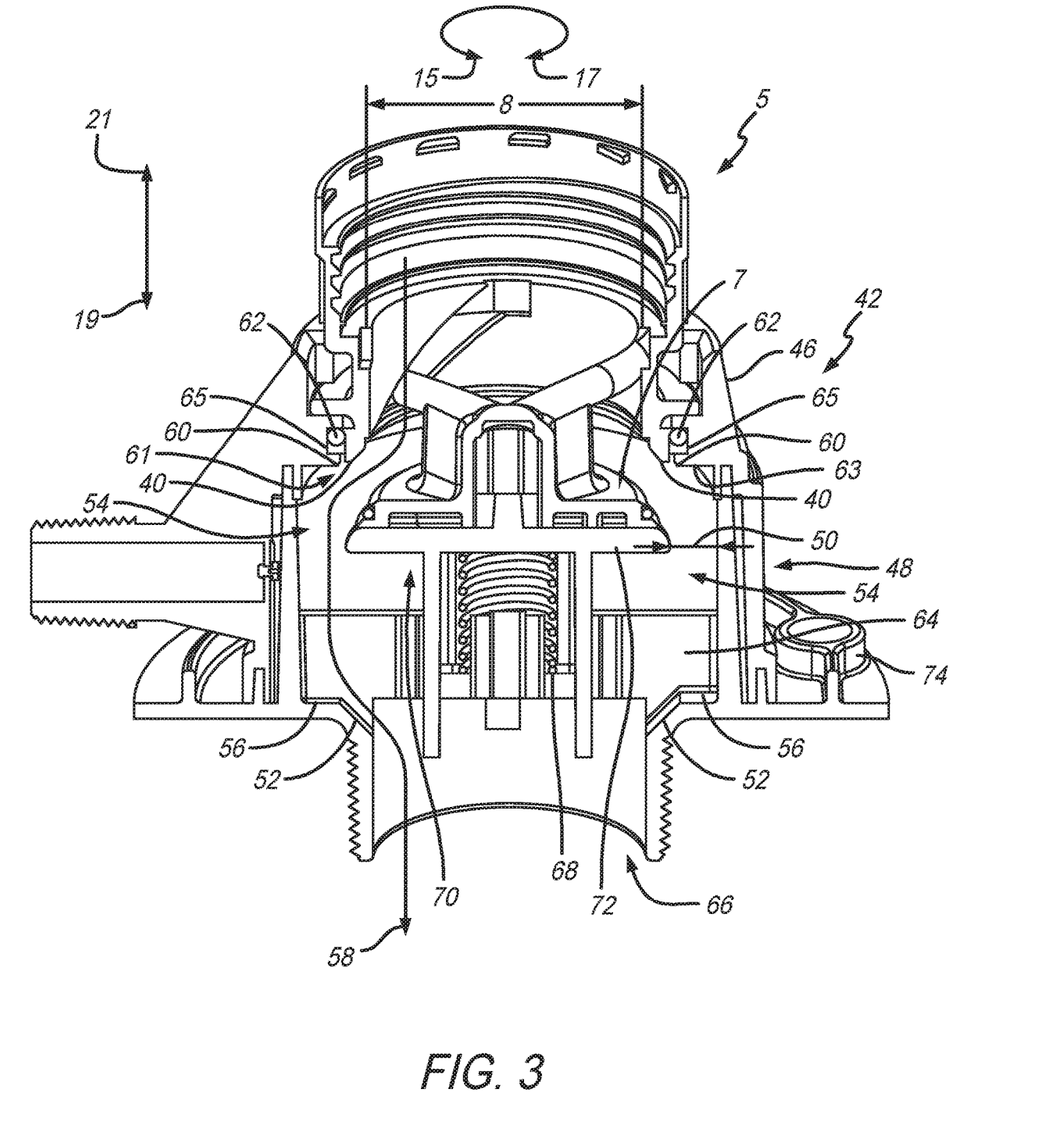
FIG. 3 is a perspective cross-sectional view of the expanded tank rinse valve assembly coupled to the closure valve.

A perspective cross-sectional view of expanded tank rinse valve assembly 42 coupled to closure valve 5 is shown in FIG. 3. This view helps demonstrate how expanded tank rinse valve assembly 42 provides less obstruction. This provides a faster flow rate for fluid to travel between tanks through closure valve 5 and expanded tank rinse valve assembly 42 in contrast to PRIOR ART tank rinse valve assembly 3 shown in FIG. 1. It is appreciated that closure valve 5 may removably couple to coupling section 46 in the same manner as the coupling between closure valve 5 and valve member 7 of PRIOR ART tank rinse valve assembly 3. Closure valve 5 in this embodiment also has an increased inner passage diameter 8 as compared to inner passage diameter 6 from PRIOR ART tank rinse valve assembly 3. Valve chamber 48 has also been expanded providing less obstruction at choke point 50 as compared to choke point 41 of the PRIOR ART by about twice the area. As shown, valve chamber 48 includes both a chamfer surface 52 along with an expanded space 54 demonstrated by a plateau or basin 56 located adjacent chamfer surface 52 as shown. This allows illustrative flow path 58 to be more expansive than flow path 37 shown in the PRIOR ART tank rinse valve assembly 3 of FIG. 1. Also, space 54 is not encumbered by seal 33, and indeed, end 40 of closure valve 5 is positioned at about opening 60 of valve chamber 48. The periphery of opening 60 is an edge 61. A ledge 63 is located adjacent edge 61 as shown. An O-ring 62 or like seal member may be disposed in a recess 65 about opening or adjacent opening 60 and configured to seal about closure valve 5 so no fluid may leak out between closure valve 5 and expanded tank rinse valve assembly 42. Opening closure valve 5 directly at the opening of valve chamber 48 further reduces obstruction for flow path 58 translating into a faster flow rate for the fluid dispensing between tanks or containers.

Also part of valve chamber 48 is cross-bar 64, similar to cross-bar 31 of the prior embodiment. A distinction, however, is that, in contrast to cross-bar 31, cross-bar 64 is located in valve chamber 48 rather than dispense conduit 66. Cross-bar 31 is located in dispense conduit 13 in PRIOR ART tank rinse valve assembly 3. Since both dispense conduits 13 and 66 are narrower than valve chambers 11 and 48, respectively, providing more obstructions in those narrower space is believed to slow down the ultimate flow rate of transferring fluid. By moving cross-bar 64 up into valve chamber 48 may offer appropriate structural stability while at the same time have less detrimental impact on the fluid flow.

Cross-bar 64 includes a base structure to support spring 68 configured to move valve assembly 70. Particularly, and similar to that discussed with respect to the PRIOR ART, when closure valve 5 is illustratively rotated in direction 17, valve member 7 moves in direction 19 pressing against the bias of spring 68 and pushing valve member 72 in direction 19. This opens both closure valve 5 and expanded tank rinse valve assembly 42 allowing fluid pathway 58 to be open between connected tanks or containers. Accordingly, with closure valve 5 dispensing right at opening 60 of valve chamber 48, which itself has been expanded as indicated by both chamfer 52 and basin 56, and moving cross-bar 64 into valve chamber 48 instead of dispense conduit 66, it is believed the dispense time maybe cut in about half as compared to prior art tank rinse valve assembly 3. It is further appreciated that when closure valve 5 is rotated in illustrative direction 15 valve member 7 is caused to move upward in direction 21. Bias from spring 68 pushes valve member 72 upward to close off valve chamber 48 at opening 60. O-ring 62 helps create a seal between the interior and exterior of valve chamber 48.

Figure 4:
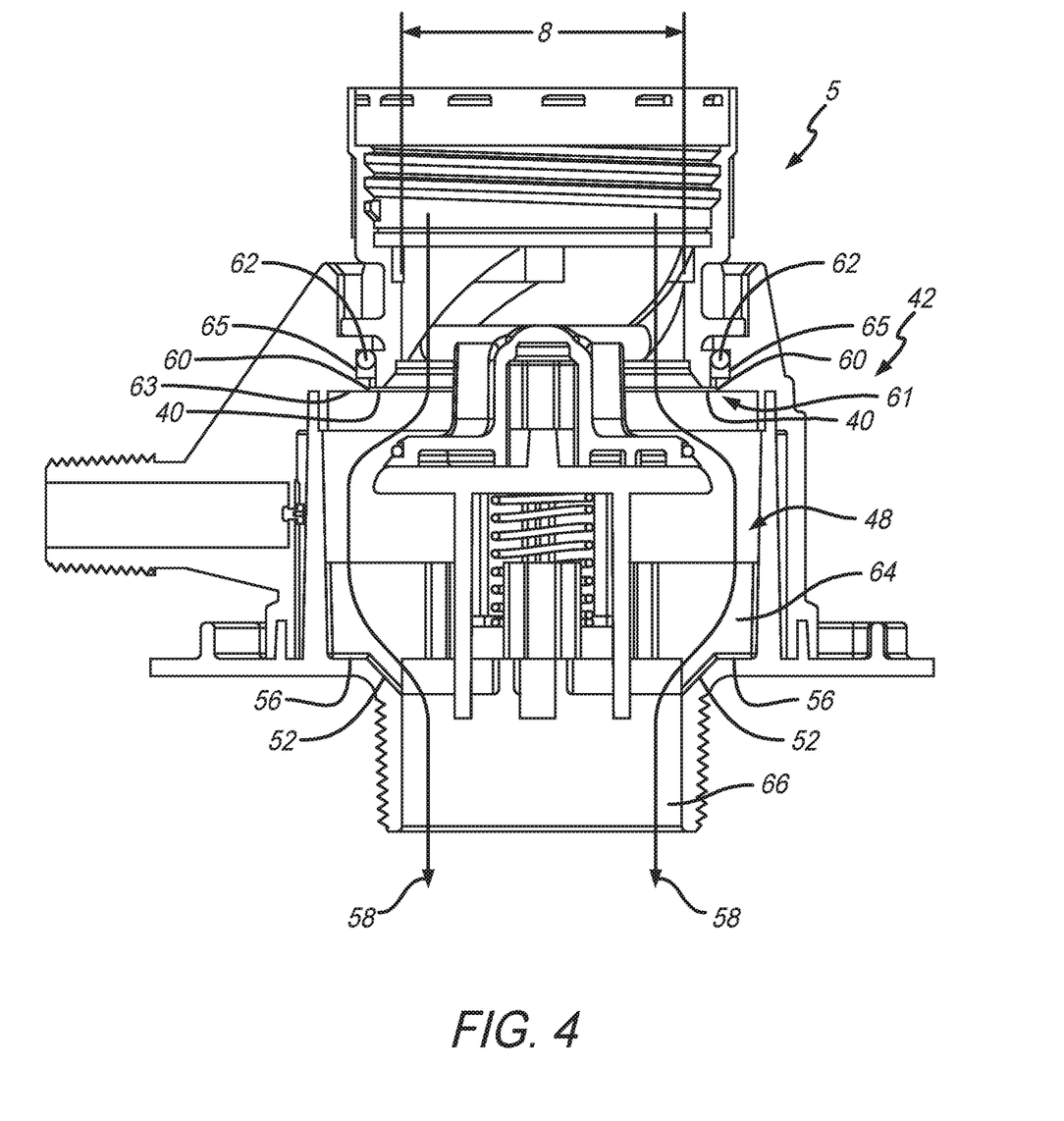
FIG. 4 is a side cross-sectional view of the expanded tank rinse valve assembly with the closure valve removably coupled thereto.

A side cross-sectional view of expanded tank rinse valve assembly 42 with closure valve 5 removably coupled thereto is shown in FIG. 4. This view further depicts how end 40 of closure valve 5 substantially aligns with end 60 of valve chamber 48. Also shown is crossbar 64 located in valve chamber 48 instead of dispense conduit 66. With chamfer surface 52 and basin 56 forming an expanded chamber 48, flow path 58 around valve member 72 moves fluid at a higher rate than what can be accomplished by PRIOR art tank rinse valve assembly 3. Also shown is closure valve 5 having increased inner passage diameter 8 as compared to inner passage diameter 6 from PRIOR ART tank rinse valve assembly 3.

Figure 5:
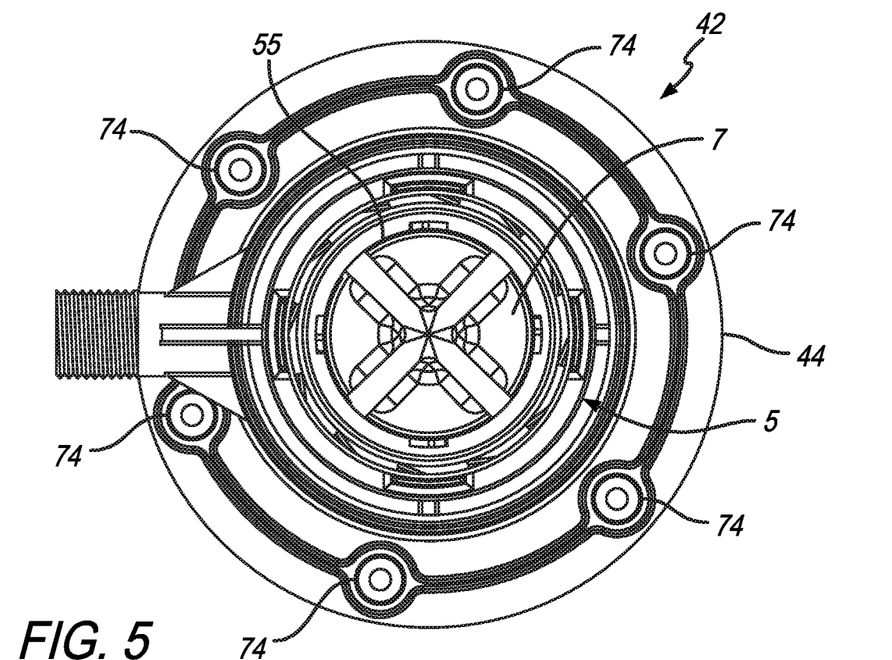
FIG. 5 is a top view of the expanded tank rinse valve assembly.

A top view of expanded tank rinse valve assembly 42 with closure valve 5 attached thereto is shown in FIG. 5. This view depicts how valve member 7 opens and closes opening 55 in closure valve 5. This view also depicts how flange 44 fits about the circular periphery of expanded tank rinse valve assembly 42 with fastener holes 74 periodically disposed thereon. It is appreciated that fastener holes 74 secure expanded tank rinse valve assembly 42 to its connected tank.

Figure 6:
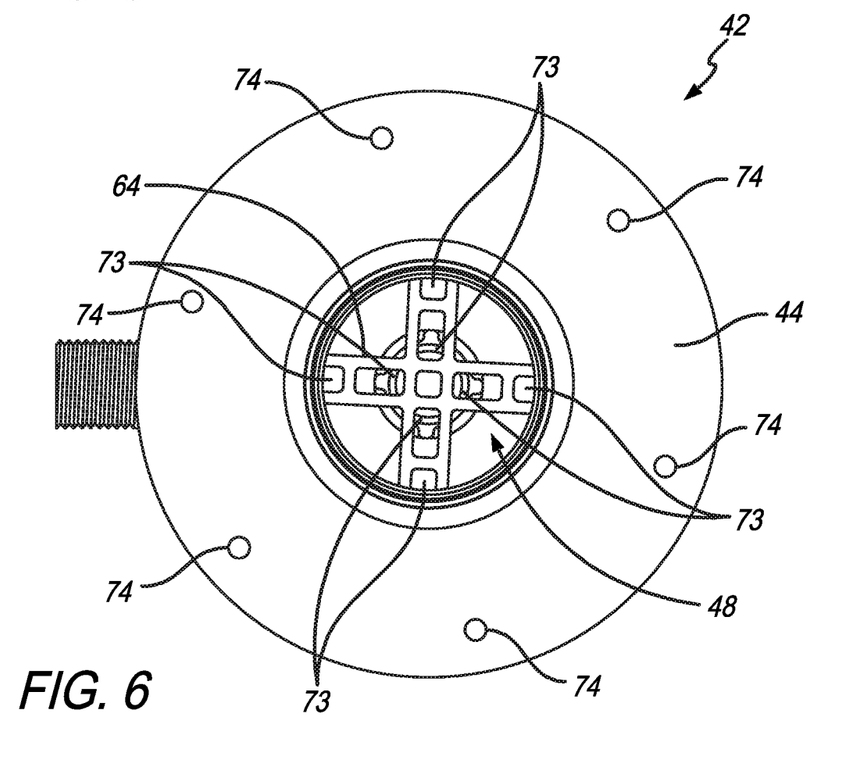
FIG. 6 is an underside view of the expanded tank rinse valve assembly.

An underside view of expanded tank rinse valve assembly 42 is shown in FIG. 6. In particular, this view depicts an upward looking view of dispense conduit 66 and into space 54 of valve chamber 48. Of particular note is the illustrative embodiment of cross-bar 64. It is appreciated from this view how a plurality of openings 73 in cross-bar 64 allow fluid to flow through cross-bar 64 to limit its impediment to the flow rate of passing fluid. Also shown in this view are fastener holes 74 of flange 44.

Figure 7:
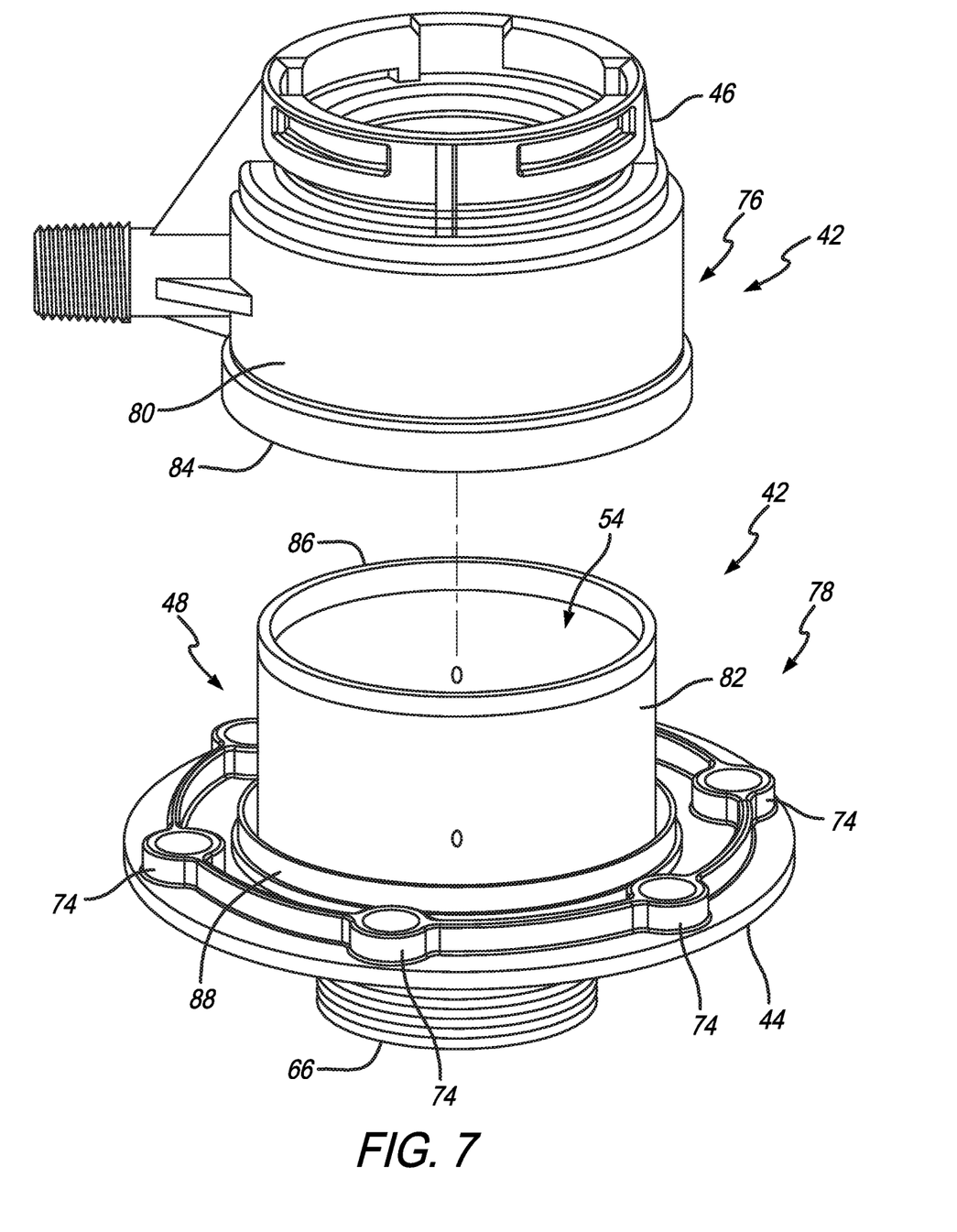
FIG. 7 is a perspective exploded view of an illustrative method of making the expanded tank rinse valve assembly.
Figure 8:
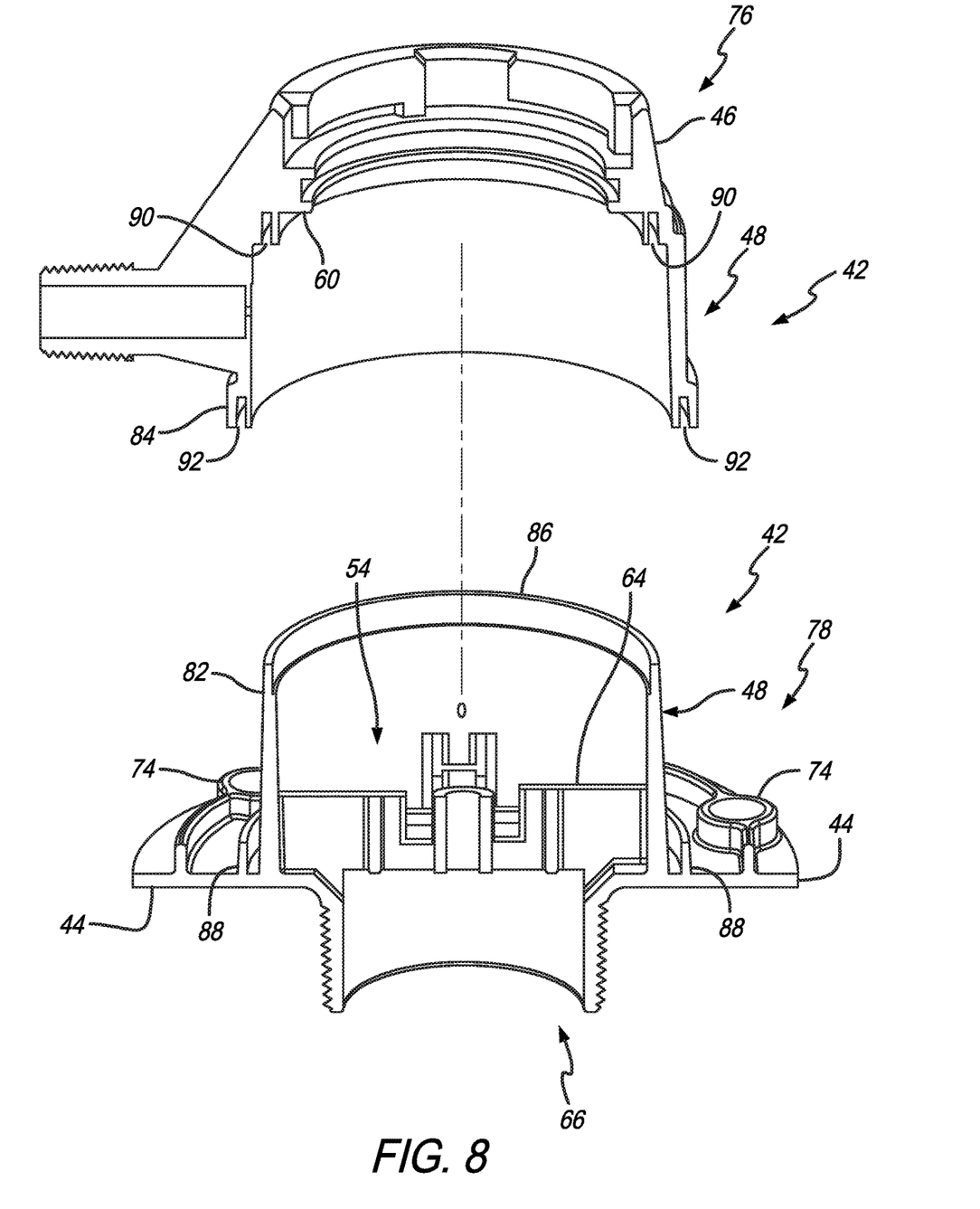
FIG. 8 is a perspective cross-sectional exploded view of the expanded tank rinse valve assembly of FIG. 7.

An illustrative method of making expanded tank rinse valve assembly 42 is shown in FIGS. 7 and 8. With respect to the perspective exploded view in FIG. 7, expanded tank rinse valve assembly 42 is composed of two-parts—cap component 76 and flow chamber component 78. Cap component 76 Includes coupling section 46. Flow chamber component 78 includes flange 44 with fastener holes 74 disposed there through. A shell 80 is configured to shroud wall 82 of flow chamber component 78. A base rim 84 is located at the lower periphery of shell 80. Flow chamber component 78 includes upward extending wall 82 which forms space 54 of valve chamber 48. A top rim 86 is located at the upper periphery of wall 82. Flange 44, with fastener holes 74 disposed there through, extends laterally from the lower portion of chamber component 78. A lower ring 88 extends about the periphery, and is spaced apart from, wall 82 on flange 44 as shown. Lastly, dispense conduit 66 extends from valve chamber 78 as shown.

A perspective cross-sectional exploded view of expanded tank rinse valve assembly 42 is shown in FIG. 8. Similar to the view in FIG. 7, expanded tank rinse valve assembly 42 includes cap component 76 and flow chamber component 78. With respect to cap component 76, it includes the interior structures of coupling section 46 such as described in the foregoing incorporated patents and applications. Also adjacent opening 60 of valve chamber 48 is slot 90 configured to receive top rim 86 of flow chamber component 78. Likewise, base rim 84 includes an interior slot 92 as shown to receive ring 88 on flange 44 of flow chamber component 78. Wall 82 of flow chamber component 78 is also shown extending upwardly terminating at top rim 86. This view also further depicts how ring 88 is spaced apart from wall 82 on flange 44. Cross-bar 64 is also further shown extended in space 54 of valve chamber 48 and above dispense conduit 66.

In the drawings, some structural or method features may be shown in specific arrangements and/or orderings. However, it should be appreciated that such specific arrangements and/or orderings may not be required. Rather, in some embodiments, such features may be arranged in a different manner and/or order than shown in the illustrative figures. Additionally, the inclusion of a structural or method feature in a particular figure is not meant to imply that such feature is required in all embodiments and, in some embodiments, may not be included or may be combined with other features. To the extent any subject matter disclosed in this non-provisional patent application differs from or is perceived as in conflict with the priority application, the disclosure in this non-provisional patent application controls and supersedes the disclosure of the priority application.

Although the present disclosure has been described with reference to particular means, materials and embodiments, from the foregoing description, one skilled in the art can easily ascertain the essential characteristics of the present disclosure and various changes and modifications may be made to adapt the various uses and characteristics without departing from the spirit and scope of the present invention as set forth in the following claims.

What is claimed is:

1. An expanded flow rate receiver valve assembly that attaches to a first fluid container and is in fluid communication with the first fluid container, the expanded flow rate receiver valve assembly comprising:
   a coupling section that selectively receives a closure valve attached to a second fluid container that selectively releases and restricts fluid contained in the second fluid container;
   a valve chamber in fluid communication with the coupling section and located adjacent a coupling section opening;
   wherein the valve chamber has a diameter;
   wherein the valve chamber is in fluid communication with the first fluid container;
   wherein the coupling section opening is formed by an edge of the coupling section and is sized to be located adjacent an end of the closure valve when received in the coupling section;
   wherein the edge of the coupling section includes a ledge that extends from the edge, away from the coupling section opening, and between the coupling section and the valve chamber;
   wherein the coupling section opening has a diameter that is less than the diameter of the valve chamber; and
   a seal that abuts the closure valve received in the coupling section to create a seal between the seal and the closure valve so no fluid can escape from the expanded flow rate receiver valve assembly between the seal and the closure valve;
   wherein the valve chamber further includes:
      a valve member that engages the closure valve;
      wherein the closure valve is rotated to open the closure valve which selectively releases fluid from the second fluid container and into the valve chamber;
      an opening located opposite the coupling section opening and defined by a chamfered surface that forms the periphery of the opening;
   wherein the opening of the valve chamber is in fluid communication with the first fluid container;
      a sidewall that forms a periphery of the valve chamber and connects to the coupling section adjacent the ledge of the coupling section;
      a plateau surface that connects to the chamfered surface opposite the opening and connects adjacent a lower edge of the sidewall opposite the coupling section;
      wherein the plateau extends transverse from the sidewall;
      at least one crossbar that extends transverse from the sidewall of the valve chamber and extends from the plateau and the chamfered surface; and
      wherein fluid that is selectively released from the closure valve travels through the valve chamber, past the crossbar, through the opening of the valve chamber, and into the first fluid container.

2. The expanded flow rate receiver valve assembly of claim 1, wherein the plateau that extends transverse to the sidewall is positioned about perpendicular to the sidewall.

3. The expanded flow rate receiver valve assembly of claim 1, wherein the at least one cross bar is a plurality of cross bars.

4. The expanded flow rate receiver valve assembly of claim 1, further comprising a dispense conduit in fluid communication with the opening of the valve chamber and located opposite the coupling section opening, wherein the dispense conduit is also in fluid in communication with the first fluid container.

5. The expanded flow rate receiver valve assembly of claim 4, wherein the crossbar is located in the valve chamber and not located in the dispense conduit.

6. The expanded flow rate receiver valve assembly of claim 1, wherein the crossbar includes a base that supports a spring to move the valve member that selectively closes the closure valve.

7. An expanded flow rate receiver valve assembly that attaches to a first fluid container and is in fluid communication with the first fluid container, the expanded flow rate receiver valve assembly comprising:
   a coupling section that selectively receives a closure valve attached to a second fluid container that selectively releases and restricts fluid contained in the second fluid container; and
   a valve chamber in fluid communication with the coupling section and located adjacent a coupling section opening;
   wherein the valve chamber is in fluid communication with the first fluid container;
   wherein the valve chamber further includes:
      an opening located opposite the coupling section opening and defined by a chamfered surface that forms a periphery of the opening;
      wherein the opening of the valve chamber is in fluid communication with the first fluid container;
      a sidewall that forms a periphery of the valve chamber and connects to the coupling section;
      a plateau surface that connects to the chamfered surface opposite the opening and connects adjacent a lower edge of the sidewall opposite the coupling section;
      wherein the plateau extends transverse from the sidewall;
      at least one crossbar that extends transverse from the sidewall of the valve chamber and extends from the plateau and the chamfered surface;
   wherein fluid that is selectively released from the closure valve travels through the valve chamber, past the crossbar, through the opening of the valve chamber, and into the first fluid container.

8. The expanded flow rate receiver valve assembly of claim 7, wherein the valve chamber has a diameter, and wherein the coupling section opening has a diameter that is less than the diameter of the valve chamber.

9. The expanded flow rate receiver valve assembly of claim 7, wherein the coupling section opening is formed by an edge of the coupling section and is sized to be located adjacent an end of the closure valve when received in the coupling section.

10. The expanded flow rate receiver valve assembly of claim 9, wherein the edge of the coupling section includes a ledge that extends from the edge, away from the coupling section opening, and between the coupling section and the valve chamber.

11. The expanded flow rate receiver valve assembly of claim 7, wherein the coupling section includes a recess spaced apart from the coupling section opening and the valve chamber, and is configured to be located adjacent the closure valve.

12. The expanded flow rate receiver valve assembly of claim 11, further comprising an O-ring that is fitted adjacent the coupling section opening to abut the closure valve received in the coupling section to create a seal between the O-ring and the closure valve so no fluid can escape from the expanded flow rate receiver valve assembly between the O-ring and the closure valve.

13. The expanded flow rate receiver valve assembly of claim 7, a valve member that engages the closure valve wherein the closure valve is rotated to open the closure valve which selectively releases fluid from the second fluid container and into the valve chamber.

14. The expanded flow rate receiver valve assembly of claim 10, wherein the sidewall that forms the periphery of the valve chamber and connects to the coupling section adjacent the ledge of the coupling section.

15. An expanded flow rate receiver valve assembly that attaches to a first fluid container and is in fluid communication with the first fluid container, the expanded flow rate receiver valve assembly comprising:
  a coupling section that selectively receives a closure valve attached to a second fluid container that selectively releases and restricts fluid contained in the second fluid container;
  a valve chamber in fluid communication with the coupling section and located adjacent a coupling section opening;
  wherein the valve chamber is in fluid communication with the first fluid container;
  wherein the coupling section opening is formed by an edge of the coupling section and is sized to be located adjacent an end of the closure valve when received in the coupling section;
  wherein the edge of the coupling section includes a ledge that extends from the edge, away from the coupling section opening, and between the coupling section and the valve chamber;
  an opening located opposite the coupling section opening and defined by a chamfered surface that forms the periphery of the opening;
  a sidewall that forms a periphery of the valve chamber and connects to the coupling section adjacent the ledge of the coupling section;
  a plateau surface that connects to the chamfered surface opposite the opening and connects adjacent a lower edge of the sidewall opposite the coupling section;
  at least one crossbar that extends transverse from the sidewall of the valve chamber and extends from the plateau and the chamfered surface.

16. The expanded flow rate receiver valve assembly of claim 15, wherein the valve chamber has a diameter, wherein the coupling section opening has a diameter that is less than the diameter of the valve chamber.

17. The expanded flow rate receiver valve assembly of claim 15, wherein the valve chamber further includes a valve member that engages the closure valve to open the closure valve to selectively release fluid from the second fluid container and into the valve chamber.

18. The expanded flow rate receiver valve assembly of claim 15, wherein the opening of the valve chamber is in fluid communication with the first fluid container.

\* \* \* \* \*